(12) United States Patent
Toda et al.

(10) Patent No.: US 6,611,228 B2
(45) Date of Patent: Aug. 26, 2003

(54) CARRIER PHASE-BASED RELATIVE POSITIONING APPARATUS

(75) Inventors: Hiroyuki Toda, Nishinomiya (JP); Sadao Sato, Nishinomiya (JP); Masaru Fukuda, Nishinomiya (JP); Kaoru Nakayama, Nishinomiya (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 0 days.

(21) Appl. No.: 09/910,850

(22) Filed: Jul. 24, 2001

(65) Prior Publication Data

US 2002/0050943 A1 May 2, 2002

(30) Foreign Application Priority Data

Jul. 24, 2000 (JP) ........................ 2000-223123

(51) Int. Cl.[7] ............................ G01S 5/02; H04B 7/185
(52) U.S. Cl. ................................. 342/357.04; 701/215
(58) Field of Search ................ 342/357.04; 701/215

(56) References Cited

U.S. PATENT DOCUMENTS 5,359,332 A * 10/1994 Allison et al. .............. 342/457
5,502,641 A * 3/1996 Isomura ...................... 342/352
6,166,683 A * 12/2000 Hwang .................. 342/357.04
RE37,256 E * 7/2001 Cohen et al. .......... 342/357.06
6,259,398 B1 * 7/2001 Riley .................... 342/357.04
6,336,061 B1 * 1/2002 Deines et al. ................ 701/213

* cited by examiner

Primary Examiner—Theodore M. Blum
(74) Attorney, Agent, or Firm—Birch, Stewart, Kolasch & Birch, LLP

(57) ABSTRACT

A carrier phase-based relative positioning apparatus comprises a plurality of antennas of which at least one is installed on a mobile unit. The apparatus determines the position of each antenna other than one antenna used as a reference antenna relative to the reference antenna by receiving radio signals transmitted from a plurality of position-fixing satellites with the multiple antennas, observing a single difference phase or a double difference phase, and calculating an integer ambiguity of the single difference phase or the double difference phase. The apparatus judges that the integer ambiguity has been incorrectly determined if the position of any of the antennas relative to the reference antenna (or the angle of a flat plane formed by those two antennas) falls out of a preset range in which the relative position (the angle of the flat plane) falls under normal conditions.

10 Claims, 9 Drawing Sheets

CARRIER PHASE-BASED RELATIVE POSITIONING APPARATUS

BACKGROUND OF THE INVENTION AND RELATED ART STATEMENT

The present invention relates to an apparatus which receives signals transmitted from position-fixing satellites by a plurality of antennas and determines the relative positions of the antennas based on carrier phases of the signals received.

Conventionally, a carrier phase-based relative positioning apparatus which receives radio signals transmitted from satellites of the global positioning system (GPS) by a plurality of antennas disposed at specific positions with one of the antennas being used as a reference antenna, and measures carrier phases of the radio signals to determine the positions of the antennas with respect to the reference antenna with high accuracy is used in a system for determining the relative position of a mobile unit with high accuracy or in a system for detecting the moving direction and attitude of a mobile unit, for example.

One important factor in carrier phase-based relative positioning technology is how correctly the integer ambiguity of the carrier phases should be determined. When determining a single difference phase between radio signal carrier phases at antenna positions based on radio signals transmitted from one satellite and received by two antennas, or when determining a double phase difference from a pair of single phase differences derived from radio signals transmitted from two satellites and received by two antennas, a directly measurable value is the carrier phase of the received radio signal up to 360°, and it is necessary to determine the integer ambiguity using other method than direct observation.

In principle, the integer ambiguity is determined by choosing possible candidates of the true integer ambiguity, screening the candidates by use of various test methods, and selecting the eventually remaining one candidate as the integer ambiguity.

More specifically, the candidates are conventionally assessed by the following methods.

(1) Assessment Using Baseline Length

It the baseline length between a pair of antennas is known, multiple candidates are evaluated depending on whether an observed baseline length matches the actual baseline length within a specified degree of accuracy.

(2) Assessment Using Residual Sum of Squares

Residues, or the differences between observed phase differences and an estimated phase difference obtained by calculation, are determined and a $\chi^2$-test is conducted using the sum of squares of the residues.

(3) Assessment Using Inner Product

If there are two or more baselines and the positions of antennas have a fixed relationship, the inner product of each pair of baselines is fixed. Using this relationship, the inner product of each pair of baselines obtained from candidates is calculated and the candidates are evaluated based on a comparison between the calculated inner product and the inner product of actual baselines.

(4) Assessment Based on Whether There Exists Only One Set of Good Integer Ambiguities Naturally, only one true integer ambiguity exists for one baseline. If one set of integer ambiguities is left after conducting some of the testing methods mentioned above, it is selected as the true integer ambiguities.

It is generally possible to determine true integer ambiguities within a reasonably short period using some of the aforementioned testing methods of the prior art. Under certain conditions, however, the conventional carrier phase-based relative positioning apparatus may happen to output considerably erroneous relative positioning results despite the fact that the obtained integer ambiguity is incorrect. Also if more than one candidate passes the aforementioned tests, it would not be possible to eventually determine the true integer ambiguity.

SUMMARY OF THE INVENTION

In view of the foregoing, it is an object of the invention to solve the aforementioned problems of the prior art by using a new testing method. It is a more specific object of the invention to provide a carrier phase-based relative positioning apparatus which is capable of improving the reliability of calculated integer ambiguities, shorten the time required for determining one set of correct integer ambiguities from a plurality of candidates, and make a more reliable judgment on a cycle slip which could occur even after determining correct integer ambiguities.

In one aspect of the invention, a carrier phase-based relative positioning apparatus comprises a plurality of antennas of which at least one is installed on a mobile unit, means for determining the relative positions of each pair of the multiple antennas by receiving radio signals transmitted from a plurality of position-fixing satellites with the multiple antennas, observing a single difference phase or a double difference phase, and calculating an integer ambiguity of the single difference phase or the double difference phase, and means for judging whether the integer ambiguity has been correctly determined based on whether the relative positions of the antennas fall in a preset range in which the relative positions will fall under normal conditions.

In this construction, if the relative positions of the antennas determined from the calculated integer ambiguity do not fall in the preset range when the range in which the relative positions will fall under normal conditions is known, the integer ambiguity is regarded as being incorrect. On the contrary, if the relative positions of the antennas fall in the preset range, the integer ambiguity is regarded as a candidate of the true integer ambiguity.

In another aspect of the invention, a carrier phase-based relative positioning apparatus comprises a plurality of antennas of which at least one is installed on a mobile unit, means for determining the attitude of a baseline vector between at least two of the multiple antennas by receiving radio signals transmitted from a plurality of position-fixing satellites with the multiple antennas, observing a single difference phase or a double difference phase, and calculating an integer ambiguity of the single difference phase or the double difference phase, and means for judging whether the integer ambiguity has been correctly determined based on whether the attitude falls in a preset range in which the attitude will fall under normal conditions.

In one practical application, the multiple antennas are installed on a vessel or an aircraft, and if attitude angles determined from the calculated integer ambiguity are unrealistic and can not be normally taken by the vessel or the aircraft, the integer ambiguity is regarded as being incorrectly determined, In the above construction, the baseline vector between two antennas provides one attitude angle of the mobile unit. If three antennas are used, two baseline vectors between them give two attitude angles respectively. When four antennas are used, they provide more than one pair of baseline vectors. In this case, attitude angles can be obtained from the individual pairs of baseline vectors. Then, a judgment may be made to determine whether each of the attitude angles falls in its normal range or, using part of the multiple baseline vectors or all of them, a judgment may be made to determine whether the optimum (or apparently the most reliable) attitude angle falls in the normal range.

In still another aspect of the invention, a carrier phase-based relative positioning apparatus comprises a plurality of antennas of which at least one is installed on a mobile unit, means for determining the attitude of the mobile unit from the relative positions of two of the multiple antennas by receiving radio signals transmitted from a plurality of position-fixing satellites with the multiple antennas, observing a single difference phase or a double difference phase, and calculating an integer ambiguity of the single difference phase or the double difference phase, and means for judging whether the integer ambiguity has been correctly determined by comparing the aforesaid attitude with the attitude of the mobile unit measured by an attitude measuring device without using the radio signals from the position-fixing satellites and judging whether the difference between the two attitudes fall in a preset range in which the difference between both will fall under normal conditions.

Since attitude angles are determined regardless of the determination of the integer ambiguity, the integer ambiguity is regarded as being incorrectly determined if the attitude angles obtained from relative positioning of carrier phases greatly differ from attitude angles obtained by the attitude measuring device.

In still another aspect of the invention, a carrier phase-based relative positioning apparatus comprises a plurality of antennas of which at least one is installed on a mobile unit, means for obtaining at least two pairs of baseline vectors from each pair of the multiple antennas by receiving radio signals transmitted from a plurality of position-fixing satellites with the multiple antennas, observing a single difference phase or a double difference phase, and calculating an integer ambiguity of the single difference phase or the double difference phase, and means for judging whether the integer ambiguity has been correctly determined by calculating the cross product of each pair of the baseline vectors and judging whether the cross product falls in a preset range in which the cross product will fall under normal conditions.

The aforementioned cross product is a vector whose magnitude is equal to the product of the magnitudes of two baseline vectors multiplied by $\sin\theta$ and direction is perpendicular to a flat plane formed by the two baseline vectors, where $\theta$ is the angle between the two baseline vectors. Therefore, if the attitude angles of the flat plane formed by the two baseline vectors fall out of their normal range more greatly as the cross product falls out of its normal range, or if the magnitude of either of the baseline vectors or the baseline length differs from the actual length by more than a specific amount, the integer ambiguity is regarded as being incorrectly determined.

In yet another aspect of the invention, the carrier phase-based relative positioning apparatus judges whether the integer ambiguity has been correctly determined based on whether the attitude of the baseline vectors and the aforementioned cross product fall in preset ranges in which they will fall under normal conditions.

In yet another aspect of the invention, a carrier phase-based relative positioning apparatus comprises a plurality of antennas installed on a body or on a moving body, means for determining the relative positions of each pair of the multiple antennas by receiving radio signals transmitted from a plurality of position-fixing satellites with the multiple antennas, observing a single difference phase or a double difference phase, and calculating an integer ambiguity of the single difference phase or the double difference phase, and means for judging whether the integer ambiguity has been correctly determined based on whether a parameter based on the relative positions of the antennas falls in a preset range in which the parameter will fall under normal conditions.

In yet another aspect of the invention, a carrier phase-based relative positioning apparatus comprises three antennas installed on a body or on a moving body, means for determining the relative positions of each pair of said three antennas by receiving radio signals transmitted from a plurality of position-fixing satellites with said three antennas, observing a single difference phase or a double difference phase, and calculating an integer ambiguity of the single difference phase or the double difference phase, and means for judging whether the integer ambiguity has been correctly determined based on whether a parameter based on the relative positions of the antennas falls in a preset range in which the parameter will fall under normal conditions.

In yet another aspect of the invention, a carrier phase-based relative positioning apparatus comprises two antennas installed on a mobile unit, means for determining the relative positions of said two antennas by receiving radio signals transmitted from a plurality of position-fixing satellites with said two antennas, observing a single difference phase or a double difference phase, and calculating an integer ambiguity of the single difference phase or the double difference phase, and means for judging whether the integer ambiguity has been correctly determined based on whether a parameter based on the relative positions of the antennas falls in a preset range in which the parameter will fall under normal conditions.

This invention serves to improve the reliability of calculated integer ambiguities and shorten the time required for eventually determining one set of correct integer ambiguities from a plurality of candidates. In addition, the invention enables a more reliable judgment on a cycle slip which could occur even after determining correct integer ambiguities.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

There will be explained the construction of a carrier phase-based relative positioning apparatus according to a first embodiment of the invention referring to FIGS. 1 through 6.

Figure 1:
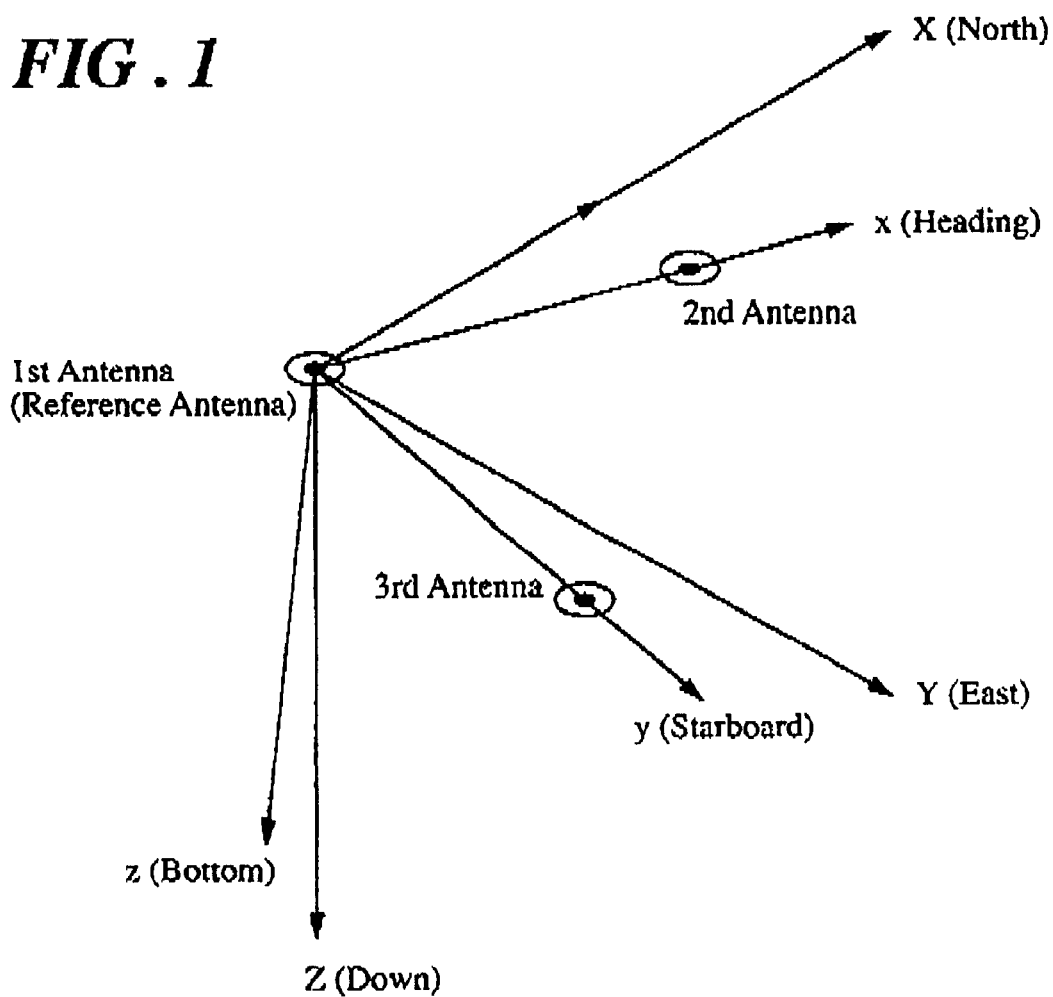
FIG. 1 is a diagram showing the arrangement of three antennas as well as the relationship between an antenna coordinate system and a local coordinate system.

FIG. 1 shows the arrangement of three antennas (first, second and third antennas) as well as the relationship between an antenna coordinate system and a local coordinate system. Referring to FIG. 1, the x axis represents the heading of a vessel (i.e., the direction in which the vessel's bow is oriented), the y axis represents the direction of the vessel's starboard side, and the z axis represents the direction of the vessel's bottom in the antenna coordinate system. Among the three antennas, the first antenna is located at the origin of the antenna coordinate system, and the second and third antennas are situated on the x axis (in the direction of the vessel's bow) and on the y axis (starboard side), respectively. On the other hand, the X, Y and Z axes of the local coordinate system are directed northward, eastward and in the vertically downward direction, respectively.

The attitude of the vessel, which may be hereinafter referred to as a mobile unit, is expressed by three attitude angles, that is, pitch angle, roll angle and yaw angle. In the example shown in FIG. 1, the three antennas are situated on the axes of the antenna coordinate system and the first antenna is used as a reference antenna. A vector drawn from the first antenna to the second antenna is referred to as the first baseline vector and a vector drawn from the first antenna to the third antenna is referred to as the second baseline vector. The angles of the individual axes of the antenna coordinate system in the local coordinate system, that is, the attitude angles of the vessel, are obtained by calculating the positions of the second and third antennas relative to the first antenna.

Figure 2:
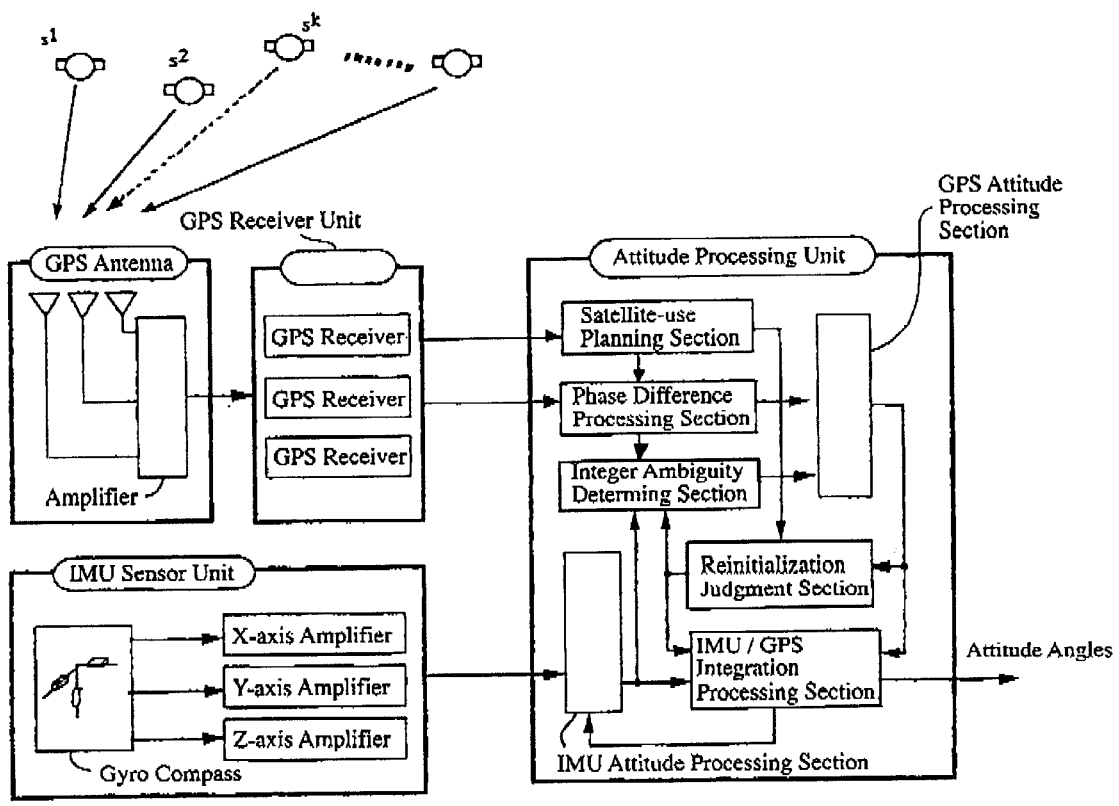
FIG. 2 is a block diagram of a carrier phase-based relative positioning apparatus according to a first embodiment of the invention.

The general construction of an attitude sensing apparatus for detecting the attitude of the mobile unit is now described referring to FIG. 2, which is a block diagram of the carrier phase-based relative positioning apparatus according to the first embodiment of the invention. In the block diagram of FIG. 2, designated by s1, s2, ... sk are GPS satellites. The GPS antenna unit receives radio signals from these GPS satellites, convert received signals into intermediate frequency (IF) signals, and amplify the IF signals. A GPS receiver unit calculates the antenna positions and carrier phase differences from the signals received by the individual antennas and outputs these data together with information on the positions of the individual satellites to an attitude data processing unit at specific time intervals (i.e., a few tens of milliseconds to a few seconds). Since the antenna positions obtained by position fixing, ephemeris information, etc. comply with a GPS coordinate system, these data are converted into the local coordinate system in a GPS receiver unit or in the attitude data processing unit.

A satellite-use planning section of the attitude data processing unit selects satellites to be used based on the satellite ephemeris information and the antenna positions and gives the antenna positions and information on the selected satellites to a phase difference processing section. The phase difference processing section calculates observed quantities of single (or double) difference phases from carrier phase difference signals received from the GPS receiver unit and delivers the resultant data to an integer ambiguity determining section. The integer ambiguity determining section determines integer ambiguities of the single (or double) difference phases of the relevant satellites, evaluates the goodness of the integer ambiguities, and gives integer ambiguity information to a GPS attitude processing section. The GPS attitude processing section calculates baseline vectors in the local coordinate system from the integer ambiguities and carrier phase difference observables output from the phase difference processing section using a known method. The attitude angles of the vessel are calculated from the baseline vectors for the local coordinate system thus obtained and the known baseline vectors for the antenna coordinate system. Since the baseline vectors in the antenna coordinate system match two of the axes of the antenna coordinate system in the example shown in FIG. 1, the baseline vectors in the local coordinate system match the directions of the axes of the antenna coordinate system. The attitude angles obtained by the GPS are hereinafter referred to as "GPS attitude angles."

Referring to FIG. 2, an inertial measurement unit (IMU) sensor unit includes a rate gyro for detecting angular velocities around three perpendicular axes which are identical to the three axes of the antenna coordinate system as well as an x-axis amplifier, y-axis amplifier and z-axis amplifier for amplifying angular velocity outputs. This IMU sensor unit outputs data on the angular velocities around the individual axes to an IMU attitude processing section of the attitude data processing unit.

The IMU attitude processing section calculates the attitude angles using Euler's equation or Gilmore's algorithm which are known. The attitude angles thus obtained are hereinafter referred to as "IMU attitude angles."

An IMU/IPS integration processing section combines the IMU attitude angles and the GPS attitude angles and eventually outputs individual attitude angles including the angles of roll, pitch and yaw.

In the example shown in FIG. 2, the attitude angles are detected by using IMU sensors. If results of IMU attitude angle calculation are not to be taken into account in determining integer ambiguities, however, a portion related to the IMU attitude angle calculation is not necessary at least for determining the integer ambiguities.

Figure 3:
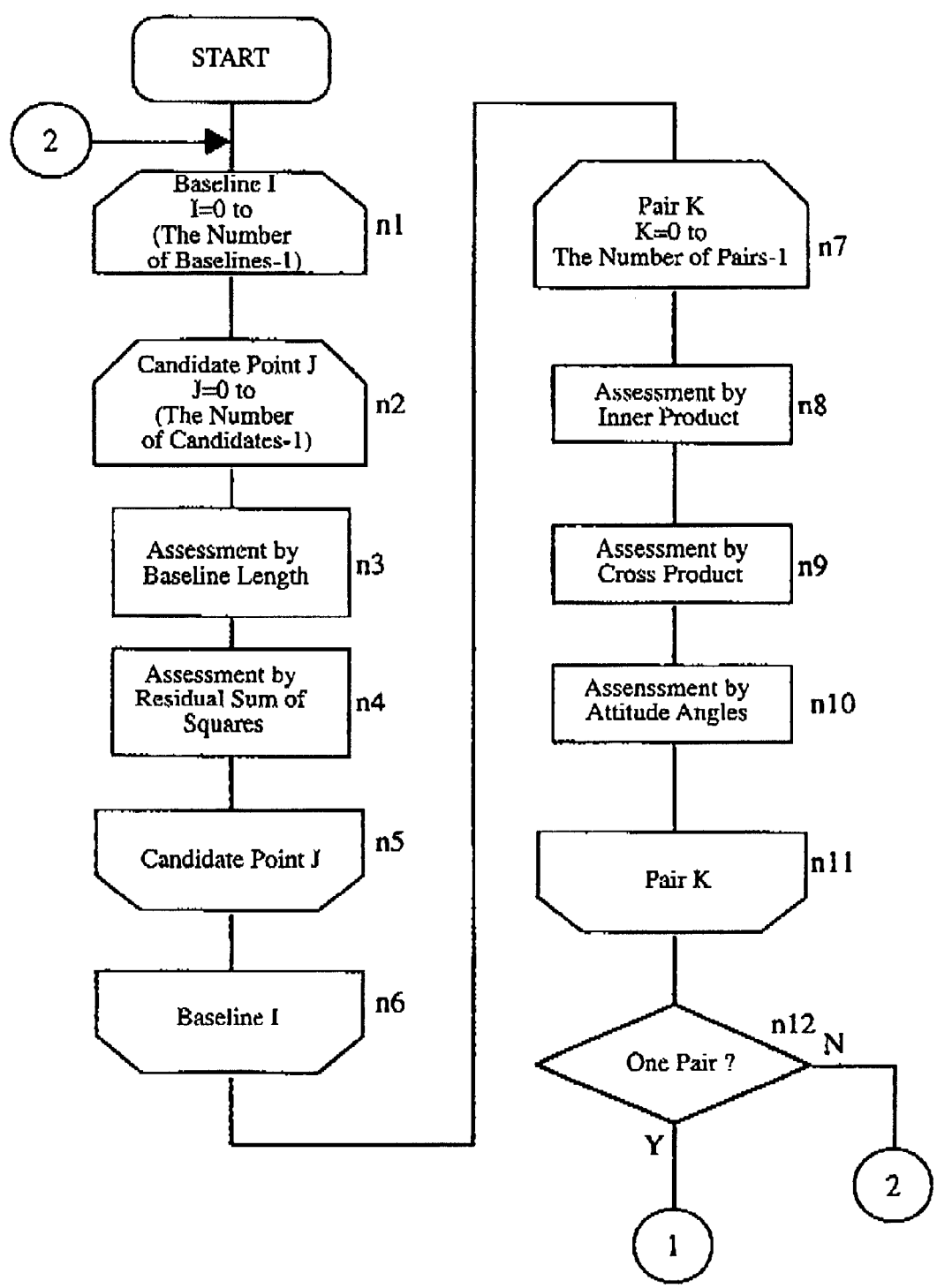
FIG. 3 is a flowchart showing a first half of an operating procedure for determining integer ambiguity.
Figure 4:
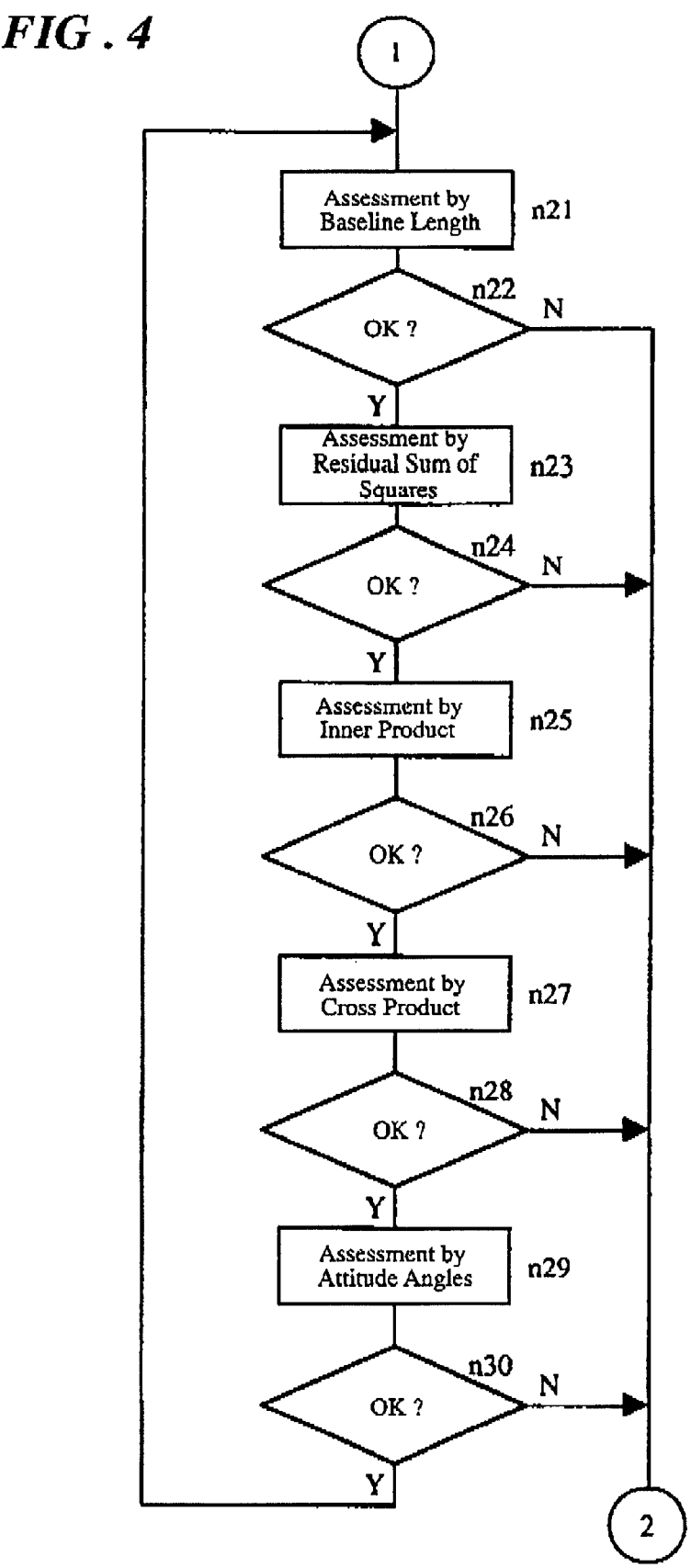
FIG. 4 is a flowchart showing a second half of the operating procedure following FIG. 3.

FIGS. 3 and 4 show a flowchart of an operating procedure performed by the attitude data processing unit of FIG. 2. In FIG. 3, shown by steps n1 to n6 is a loop that repeats until baseline number I is incremented from 0 to (the number of baselines—1). Similarly, defined by steps n2 to n5 is a loop that repeats until candidate point number J is incremented from 0 to (the number of candidates—1). This double loop process assesses each baseline for which an integer ambiguity should be determined and a candidate point of each baseline using the baseline length and the residual sum of squares, respectively (steps n3, n4).

In the assessment of step n3, the length of a baseline vector obtained when an assumed integer ambiguity is used and an already known baseline length are compared with each other, and a judgment is made to determine whether their difference exceeds a specific permissible error range. If the difference exceeds the permissible error range, a corresponding candidate point is abandoned. This means that the relevant candidate point is excluded from later assessment. In step n4, residues, or the differences between observed phase differences and estimated phase differences obtained by calculation, are determined and a $\chi^2$-test is conducted using the sum of squares of the residues thus obtained.

In FIG. 3, shown by steps n7 to n11 is a loop that repeats until pair number K of all pairs of candidates of individual baselines which have passed the aforementioned tests is incremented from 0 to (the number of pairs—1). This loop includes testing of inner products (step n8), cross products (step n9) and attitude angles (step n10).

In step n8, the inner product (scalar product) of two baseline vectors is calculated and a judgment is made to determine whether the inner product falls within a specific permissible error range of a preset value. If the inner product does not fall within the permissible error range, the pair of the two baseline vectors is abandoned. This means that the relevant candidate point is excluded from later assessment.

In step n9, the cross product (vector product) of the aforementioned two baseline vectors is calculated and a judgment is made to determine whether the cross product falls within a specific permissible error range of a preset value (vector). If the cross product does not fall within the permissible error range, the pair of the two baseline vectors is abandoned. Also in step n10, the attitude angles (angles of roll, pitch and yaw) of the vessel are calculated from the positions of two antennas relative to the reference antenna and a judgment is made to determine whether the attitude angles fall within preset ranges.

If only one pair of candidates is left after carrying out the aforementioned tests on all the pairs of candidates, that pair is regarded as the correct integer ambiguity calculated for the two baselines. If there exists zero or more than one pair of candidates which has passed the aforementioned tests, the operation flow returns to the beginning (steps n12 to n1) and the aforementioned testing procedure is reexecuted.

Figure 5:
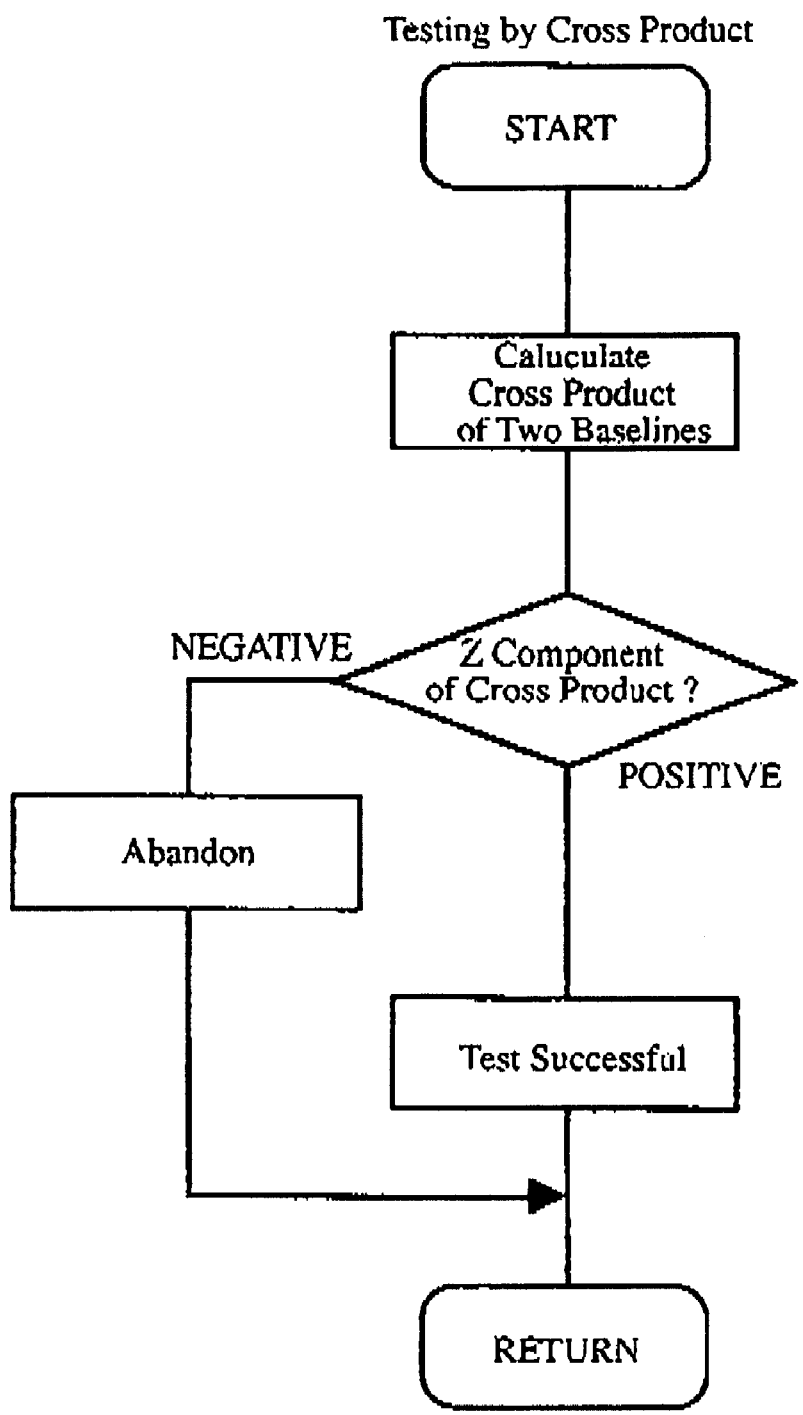
FIG. 5 is a flowchart showing an assessment procedure conducted on cross products.

FIG. 5 is a flowchart showing a testing procedure performed in step n9 of FIG. 3. In this testing procedure by use of cross products, the cross product of two baseline vectors is calculated and a judgment is made to determine whether the Z component of the cross product (or its component directed vertically downward in the local coordinate system) has a positive or negative value. If there is a relationship that the Z component of the aforementioned cross product is negative when the vector representing the cross product of two baseline vectors given by three antennas situated in a horizontal plane is directed in the positive direction of the Z axis of the local coordinate system, for example, the z axis of the antenna coordinate system is directed upward with respect to the horizontal plane. Since such a relationship indicates that the roll angle is larger than 90°, the relevant cross product is abandoned when the Z component of the cross product is negative.

Figure 6:
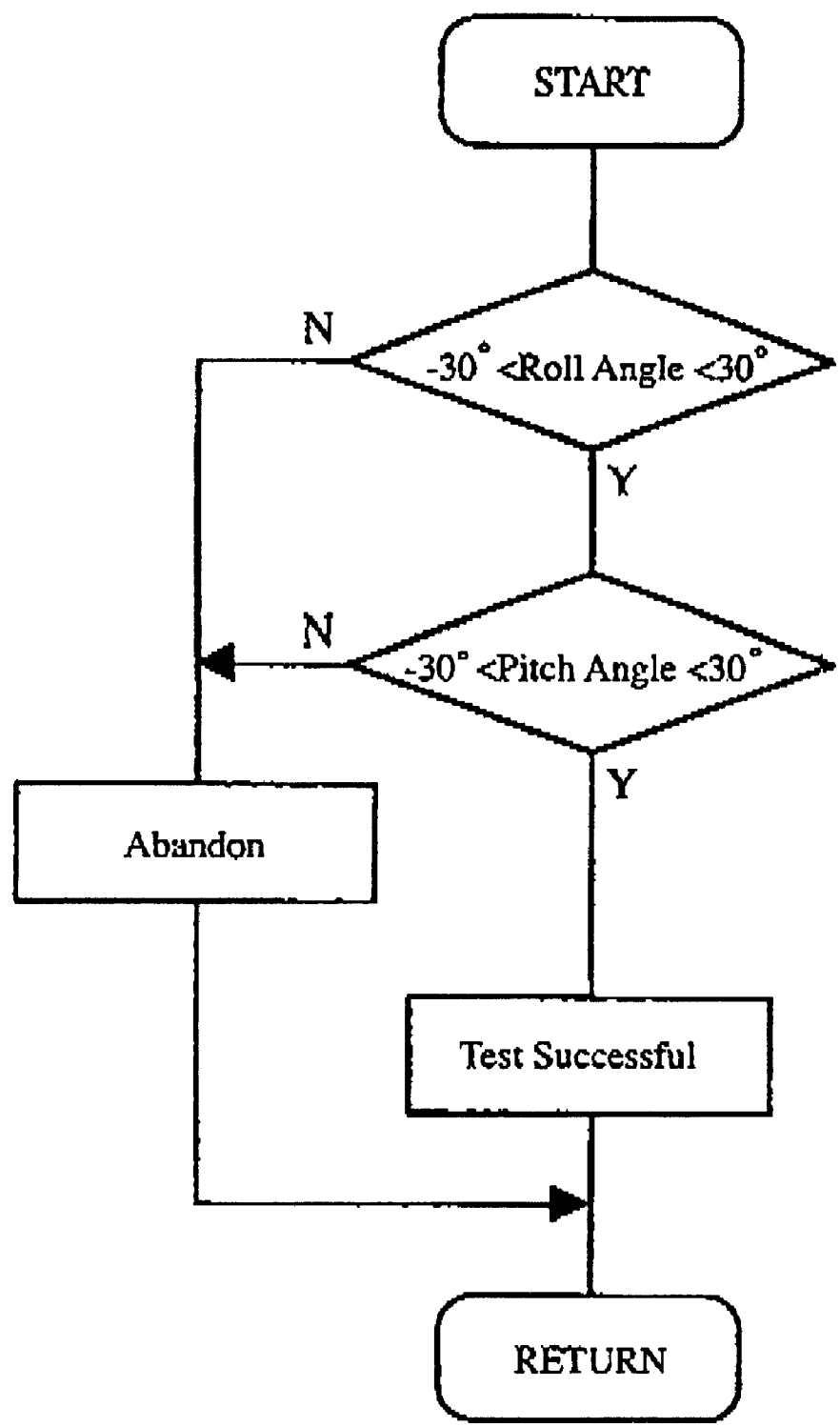
FIG. 6 is a flowchart showing an assessment procedure conducted on attitude angles.

FIG. 6 is a flowchart showing a testing procedure performed in step n10 of FIG. 3. In the present embodiment, it is judged whether the roll angle is within a range of ±30° and whether the pitch angle is within a range of ±30°, and if the roll angle or the pitch angle is out of the range of ±30°, the relevant pair of two baseline vectors is abandoned based on a judgment that the candidate point being tested is invalid, because the relevant pair of baseline vectors gives the attitude angles that cause the vessel to overturn.

The aforementioned testing by the attitude angles need not necessarily be made in units of angles. Provided that the baseline vector between two antennas exists in an x-z plane and the coordinates of one antenna are (0, 0, 0) and the coordinates of the other antenna are (x, 0, z), for example, there is a relationship expressed by tan$\theta$=z/x where $\theta$ is the angle formed by the baseline vector between the two antennas and the horizontal plane. As an alternative, the value z/x may be used as a quantity representative of the attitude of the vessel. In this case, a judgment should be made to determine whether the value z/x falls within a preset normal range. This alternative approach serves to reduce computational complexity as it makes operation by use of trigonometric functions unnecessary.

The aforementioned test by the cross products has substantially the same effect as the test by the attitude angles described in step n10 above, so that it is possible to omit one of these tests. The test by the cross products has the advantage that the computational complexity for calculating the cross products is smaller than that for calculating the attitude angles. On the other hand, it is necessary to install two antennas in the athwartship direction or in the fore-and-aft direction for judging only the roll angle or the pitch angle, whereas at least three antennas are needed to calculate a cross product If the candidate points are screened by first making the judgment by the cross products which require smaller computational complexity followed by the judgment by the attitude angles as shown in FIG. 3, it is possible to reduce the overall computational complexity.

FIG. 4 is part of the flowchart that follows FIG. 3 showing the operation performed after determining integer ambiguities. Various tests are reexecuted even after the integer ambiguities have been determined. This is because a cycle slip could occur after determination of the correct integer ambiguities and because there exists the possibility that the obtained integer ambiguities are incorrect. In the example shown in FIG. 4, assessment by baseline lengths (step n21), assessment by the residual sum of squares (step n23), assessment by inner products (step n25), assessment by cross products (step n27), and assessment by attitude angles (step n29) are carried out, and if any of these tests is unsuccessful, the operation flow returns to step n1 and the integer ambiguities redetermined.

Figure 7:
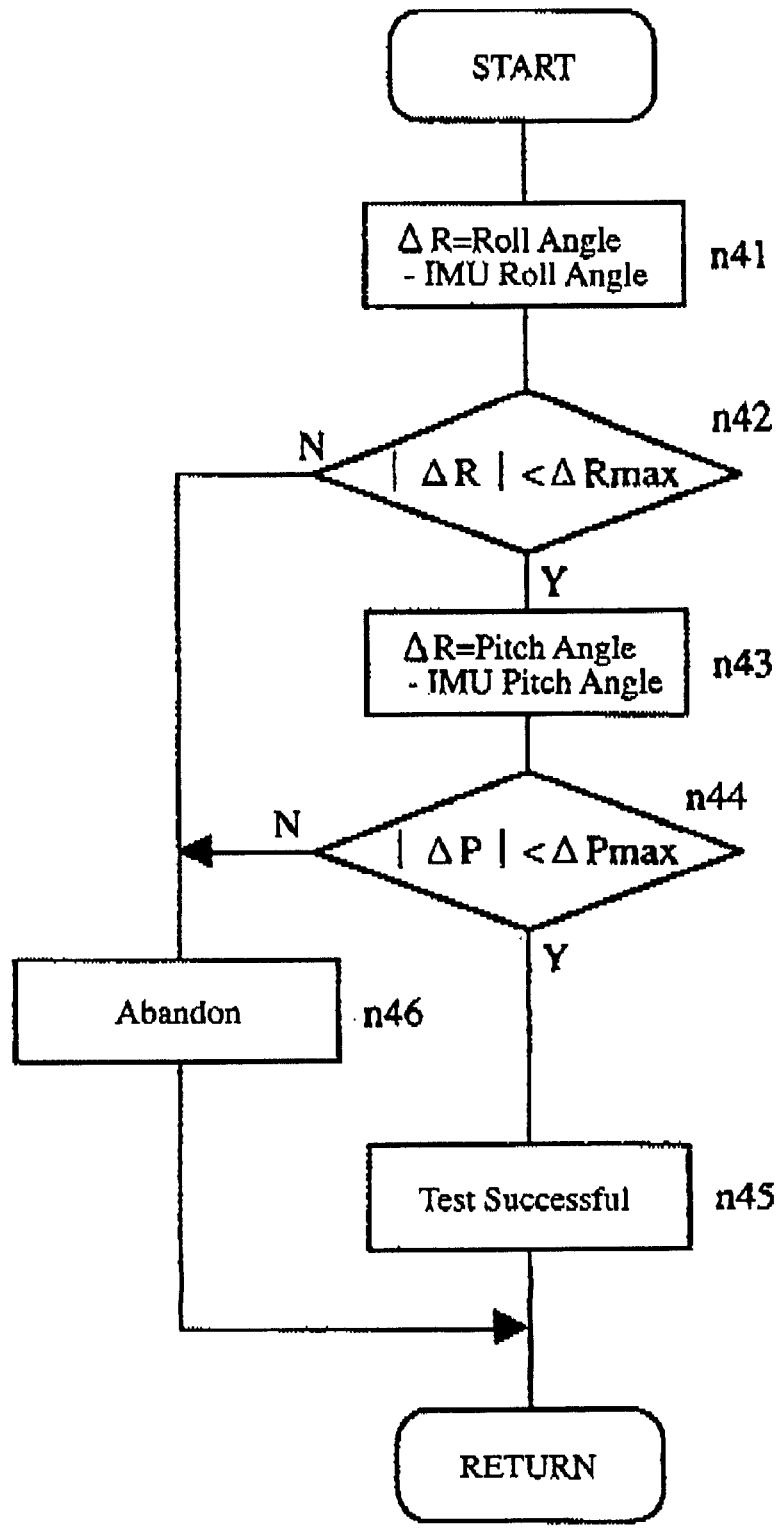
FIG. 7 is a flowchart showing an assessment procedure conducted on attitude angles according to a second embodiment of the invention.

Next, assessment conducted by use of attitude angles in a carrier phase-based relative positioning apparatus according to a second embodiment of the invention is described referring to a flowchart shown in FIG. 7. This assessment is intended to replace the aforementioned testing procedures conducted on the attitude angles (step n10 of FIG. 3 and step n29 of FIG. 4) of the first embodiment. First, the roll angle of the vessel is calculated from the positions of two antennas relative to the reference antenna and the difference $\Delta R$ between the roll angle thus obtained and a roll angle calculated by the IMU attitude processing section shown in FIG. 2 is obtained. Then, a judgment is made to determine whether the absolute value of this difference $\Delta R$ is less than a preset upper limit $\Delta Rmax$ (step n41 to n42). If the absolute value of $\Delta R$ is equal to or larger than the upper limit $\Delta Rmax$, the relevant candidate point is abandoned (step n46). Similarly, the pitch angle of the vessel is calculated from the positions of the two antennas relative to the reference antenna and the difference $\Delta P$ between the pitch angle thus obtained and a pitch angle calculated by the IMU attitude processing section shown in FIG. 2 is obtained. Then, a judgment is made to determine whether the absolute value of this difference $\Delta P$ is less than a preset upper limit $\Delta Pmax$ (step n43 to n44). It the absolute value of $\Delta P$ is equal to or larger than the upper limit $\Delta Pmax$, the relevant candidate point is abandoned (step n46). This means that if the present assessment is a test performed halfway in the process of determining an integer ambiguity, the relevant candidate point is excluded from later assessment. Also, if the present assessment is a test performed after once determining an integer ambiguity, the integer ambiguity is regarded as being incorrectly determined. Alternatively, it is assumed that a cycle slip has occurred.

The construction of a carrier phase-based relative positioning apparatus according to a third embodiment of the invention is described referring to FIGS. 8A through 8C and FIGS. 9A and 9B.

Figure 8A:
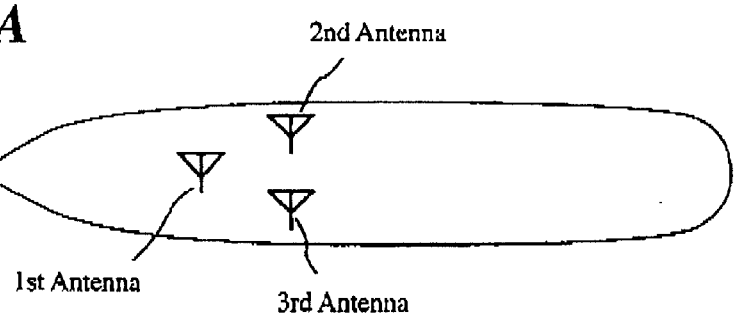
FIGS. 8A through 8C are diagrams showing an antenna arrangement according to a third embodiment of the invention.
Figure 8B:
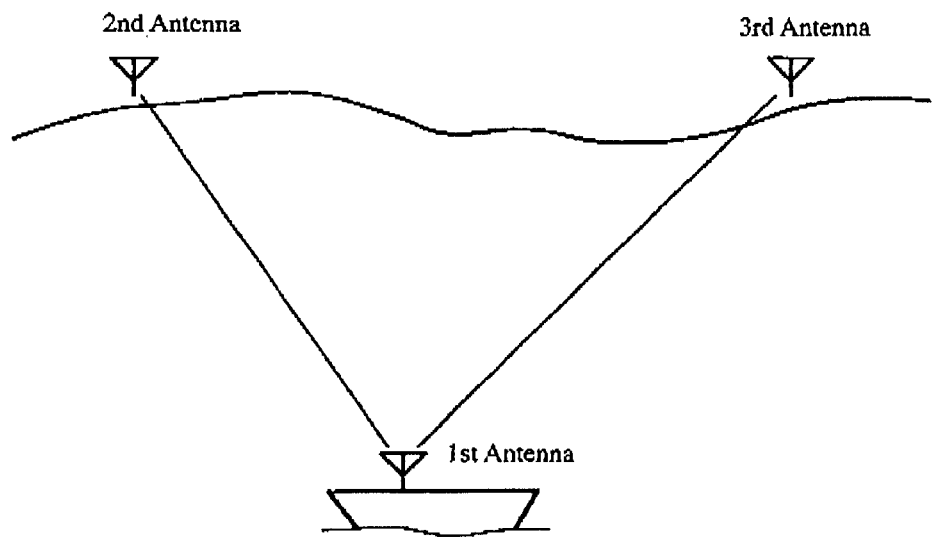
Figure 8C:
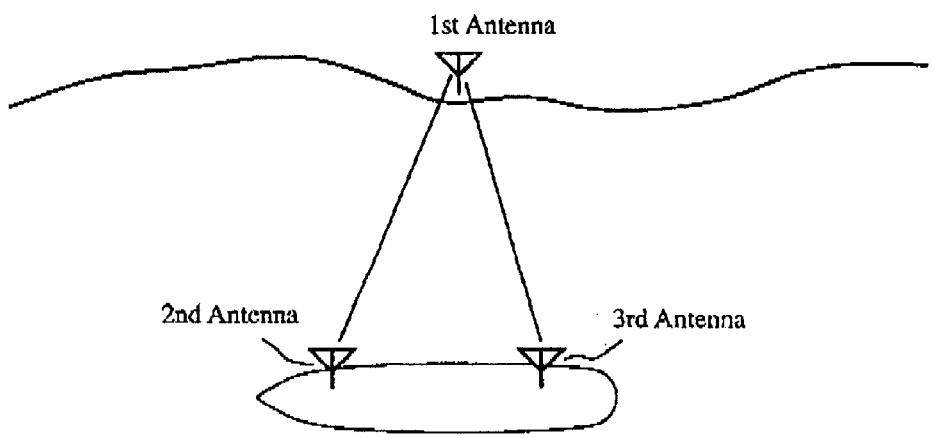

Although two or more antennas are installed on a mobile unit like a vessel and the attitude angles of the mobile unit are determined by determining the positions of the individual antennas except for one used as a reference antenna relative to the reference antenna in the aforementioned embodiments, it is possible to employ such a configuration that one of multiple antennas used for relative positioning is installed on the mobile unit and the other antennas are installed at fixed coastal stations, for example. For example, a first antenna may be installed on a vessel with second and third antennas installed at two separate points on a seashore, as shown in FIG. 8B. The configuration of FIG. 8B may be regarded as a system whose antenna arrangement is just enlarged from what is shown in FIG. 8A, with baselines between the first antenna and the second and third antennas multiplied by a specific factor. Accordingly, determining the attitude angles of a flat plane formed by the first to third antennas using the antenna arrangement of FIG. 8B is substantially equivalent to determining the attitude angles of the vessel using the antenna arrangement of FIG. 8A, FIG. 8C shows another example of antenna arrangement, in which one antenna is installed at a fixed coastal station and two antennas are installed on a vessel. Again, determining the attitude angles of a flat plane formed by the three antennas using the antenna arrangement of FIG. 8C is substantially equivalent to determining the attitude angles of the vessel using the antenna arrangement of FIG. 8A.

It will be understood from the above discussion that if the attitude of the flat plane formed by the three antennas, or the angle between the flat plane formed by the three antennas and the horizontal plane, is unrealistic judging from the attitude angles obtained, the relevant candidate point should be abandoned. In either the antenna arrangement of FIG. 8A or 8B, any one of the three antennas may be used as the reference antenna.

Figure 9A:
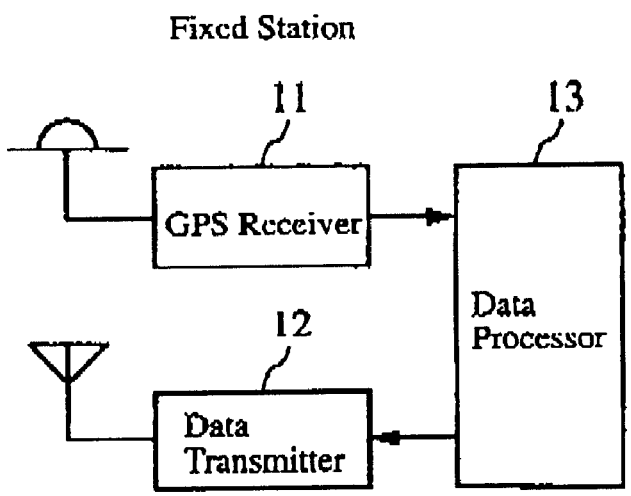
FIGS. 9A and 9B are block diagrams showing the construction of fixed and mobile stations which configure a carrier phase-based relative positioning apparatus according to the third embodiment.
Figure 9B:
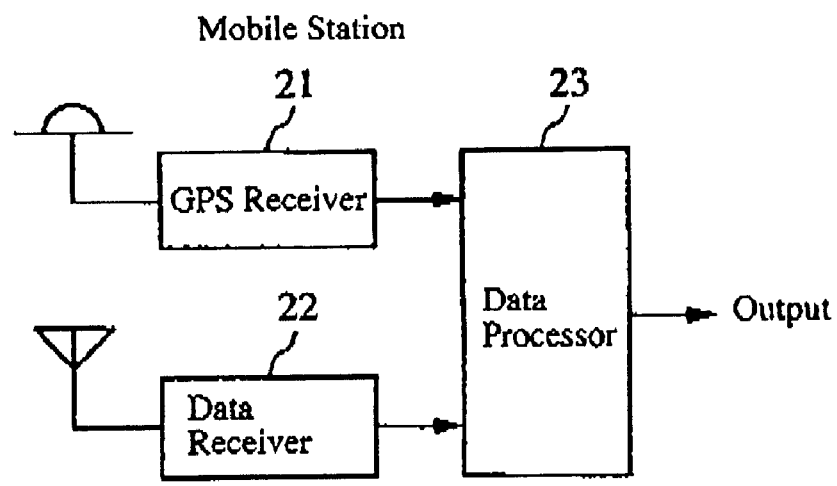

FIGS. 9A and 9B are block diagrams showing the construction of the apparatus installed at the fixed and mobile stations. The apparatus at the fixed station comprises a GPS receiver 11, a data processor 13 and a data transmitter 12. The GPS receiver 11 tracks the carrier phases of the signals transmitted from a plurality of satellites whose transmitting signals can be received, the data processor 13 outputs data including each set of a satellite number and carrier phase, and the data transmitter 12 transmits the data to the mobile stations. Each mobile station comprises a GPS receiver 21, a data processor 23 and a data receiver 22. The GPS receiver 21 receives radio signals from each of the receivable satellites and determines their carrier phases. The data receiver 22 receives data on the carrier phases of the individual satellites measured at the fixed station and transmitted therefrom. The data processor 23 determines a single (or double) difference phase for each pair of the specific reference antenna and the other antenna. When determining their integer ambiguities, the data processor 23 uses the attitude angles of the flat plane formed by the aforementioned three antennas for assessment.

In the example of the operating procedure shown in FIG. 3, the assessment by baseline lengths and the assessment by the residual sum of squares may be carried out in any desired order. In addition, the assessment by inner products, the assessment by cross products and the assessment by attitude angles may be carried out in any desired order. Also, the assessment by the cross products and the assessment by the inner products, whichever desired, may be omitted as previously stated. Furthermore, although the number of pairs of candidates which have successfully passed the tests need to be eventually verified, this verification may be halfway, such as prior to the assessment by the inner products, for example, and unnecessary testing procedures which will otherwise be conducted after the number of pairs has become one may be skipped.

Furthermore, although the assessment by inner products, the assessment by cross products, the assessment by attitude angles and the assessment by the number of pairs of candidates which have successfully passed the tests are conducted in this order and the candidates which have successfully the preceding test is subjected to the current test in the example of FIG. 3, this procedure may be so modified as to simultaneously conduct the assessments by inner products, cross products and attitude angles at first and then to verify that only one pair of candidates has passed the assessments. Moreover, although three antennas are installed in the example shown in FIG. 1, there may be provided only two antennas as previously mentioned, in which case attitude angles other than around the baseline between the two antennas should be determined.

What is claimed is:

1. A carrier phase-based relative positioning apparatus comprising:
   a plurality of antennas of which at least one is installed on a mobile unit;
   means for determining the relative positions of the multiple antennas by receiving radio signals transmitted from a plurality of position-fixing satellites with the multiple antennas, observing a single phase difference or a double phase difference, and calculating an integer ambiguity of the single phase difference or the double phase difference; and
   means for judging whether the integer ambiguity has been correctly determined based on whether the relative positions of the antennas fall in a preset range in which the relative positions will fall under normal conditions.

2. A carrier phase-based relative positioning apparatus comprising:
   a plurality of antennas of which at least one is installed on a mobile unit;
   means for determining the attitude of a baseline vector between at least two of the multiple antennas by receiving radio signals transmitted from a plurality of position-fixing satellites with the multiple antennas, observing a single difference phase or a double difference phase, and calculating an integer ambiguity of the single difference phase or the double difference phase; and
   means for judging whether the integer ambiguity has been correctly determined based on whether the attitude falls in a preset range in which the attitude will fall under normal conditions.

3. A carrier phase-based relative positioning apparatus comprising:
   a plurality of antennas of which at least one is installed on a mobile unit;
   means for determining the attitude of the mobile unit from the relative positions of two of the multiple antennas by receiving radio signals transmitted from a plurality of position-fixing satellites with the multiple antennas, observing a single difference phase or a double difference phase, and calculating an integer ambiguity of the single difference phase or the double difference phase; and means for judging whether the integer ambiguity has been correctly determined by comparing said attitude with the attitude of the mobile unit measured by an attitude measuring device without using the radio signals from the position-fixing satellites and judging whether the difference between said two attitudes fall in a preset range in which the difference between both will fall under normal conditions.

4. A carrier phase-based relative positioning apparatus comprising:

a plurality of antennas of which at least one is installed on a mobile unit;

means for obtaining at least two baseline vectors from two pairs of the multiple antennas by receiving radio signals transmitted from a plurality of position-fixing satellites with the multiple antennas, observing a single phase difference or a double phase difference, and calculating an integer ambiguity of the single phase difference or the double phase difference; and means for judging whether the integer ambiguity has been correctly determined by calculating the cross product of the two baseline vectors and judging whether the cross product falls in a preset range in which the cross product will fall under normal conditions.

5. A carrier phase-based relative positioning apparatus comprising:

a plurality of antennas of which at least one is installed on a mobile unit;

means for obtaining at least two baseline vectors from two pairs of the multiple antennas by receiving radio signals transmitted from a plurality of position-fixing satellites with the multiple antennas, observing a single phase difference or a double phase difference, and calculating an integer ambiguity of the single phase difference or the double phase difference;

means for calculating the cross product of the two baseline vectors;

means for determining the attitude of the baseline vectors; and means for judging whether the integer ambiguity has been correctly determined based on whether the attitude of the baseline vectors and the cross product fall in preset ranges in which they will fall under normal conditions.

6. A carrier phase-based relative positioning apparatus as claimed in claims 1, 2, 3, 4 or 5 in which a plurality of antennas are installed on a mobile unit.

7. A carrier phase-based relative positioning apparatus comprising:

a plurality of antennas installed on a body or on a moving body;

means for determining the relative positions of the multiple antennas by receiving radio signals transmitted from a plurality of position-fixing satellites with the multiple antennas, observing a single phase difference or a double phase difference, and calculating an integer ambiguity of the single phase difference or the double phase difference; and means for judging whether the integer ambiguity has been correctly determined based on whether a parameter based on the relative positions of the antennas falls in a preset range in which the parameter will fall under normal conditions.

8. A carrier phase-based relative positioning apparatus as claimed in claim 7 in which a parameter is the attitude of a baseline vector or vectors between at least two of the multiple antennas determined.

9. A carrier phase-based relative positioning apparatus comprising:

three antennas installed on a body or on a moving body;

means for determining the relative positions of said three antennas by receiving radio signals transmitted from a plurality of position-fixing satellites with said three antennas, observing a single phase difference or a double phase difference, and calculating an integer ambiguity of the single phase difference or the double phase difference; and means for judging whether the integer ambiguity has been correctly determined based on whether a parameter based on the relative positions of the antennas falls in a preset range in which the parameter will fall under normal conditions.

10. A carrier phase-based relative positioning apparatus comprising:

two antennas installed on a mobile unit;

means for determining the relative positions of said two antennas by receiving radio signals transmitted from a plurality of position-fixing satellites with said two antennas, observing a single difference phase or a double difference phase, and calculating an integer ambiguity of the single difference phase or the double difference phase; and means for judging whether the integer ambiguity has been correctly determined based on whether a parameter based on the relative positions of the antennas falls in a preset range in which the parameter will fall under normal conditions.

* * * * *